United States Patent
Miyatake (10) Patent No.: US 7,929,007 B2
(45) Date of Patent: Apr. 19, 2011

(54) OPTICAL SCANNING DEVICE AND IMAGE FORMING APPARATUS

(75) Inventor: Naoki Miyatake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/193,902

(22) Filed: Aug. 19, 2008

(65) Prior Publication Data
US 2009/0073528 A1 Mar. 19, 2009

(30) Foreign Application Priority Data
Sep. 13, 2007 (JP) ................... 2007-238198

(51) Int. Cl.
B41J 15/14 (2006.01)
B41J 27/00 (2006.01)
(52) U.S. Cl. ........................................ 347/241; 347/256
(58) Field of Classification Search .................. 347/229, 347/234, 235, 248–250, 263, 241–245, 256–261
See application file for complete search history.

(56) References Cited

U.S. PATENT DOCUMENTS

| | | | | |
|---|---|---|---|---|
| 4,847,644 | A * | 7/1989 | Oda et al. ........................ 347/258 |
| 5,680,254 | A | 10/1997 | Ueda et al. |
| 6,366,385 | B2 * | 4/2002 | Kimura ........................ 359/204.1 |
| 6,621,512 | B2 | 9/2003 | Nakajima et al. |
| 6,771,300 | B2 | 8/2004 | Amada et al. |
| 6,813,051 | B2 | 11/2004 | Suzuki et al. |
| 6,987,593 | B2 | 1/2006 | Hayashi et al. |
| 7,050,082 | B2 | 5/2006 | Suzuki et al. |
| 7,050,210 | B2 | 5/2006 | Atsuumi et al. |
| 7,088,484 | B2 | 8/2006 | Hayashi et al. |
| 7,161,724 | B1 | 1/2007 | Miyatake |
| 7,167,288 | B2 | 1/2007 | Miyatake et al. |
| 7,253,827 | B2 * | 8/2007 | Ishihara ........................ 347/235 |
| 7,277,212 | B2 | 10/2007 | Miyatake et al. |
| 7,411,712 | B2 | 8/2008 | Nakajima et al. |
| 7,505,187 | B2 * | 3/2009 | Oda et al. ........................ 347/244 |
| 2004/0240000 | A1 | 12/2004 | Miyatake et al. |
| 2006/0187294 | A1 | 8/2006 | Saisho et al. |
| 2006/0203264 | A1 | 9/2006 | Miyatake |
| 2007/0002417 | A1 | 1/2007 | Hirakawa et al. |
| 2007/0030538 | A1 | 2/2007 | Hirakawa et al. |
| 2007/0215800 | A1 | 9/2007 | Miyatake et al. |
| 2007/0216754 | A1 | 9/2007 | Miyatake |
| 2007/0297036 | A1 | 12/2007 | Nakamura et al. |
| 2008/0062491 | A1 | 3/2008 | Nakamura et al. |
| 2008/0068691 | A1 | 3/2008 | Miyatake |
| 2008/0180772 | A1 | 7/2008 | Miyatake et al. |

(Continued)

FOREIGN PATENT DOCUMENTS

JP         08271819  A  * 10/1996

(Continued)

Primary Examiner — Hai C Pham
(74) Attorney, Agent, or Firm — Oblon, Spivak, McClelland, Maier & Neustadt, L.L.P.

(57) ABSTRACT

In an optical scanning device of opposite scanning type, two target surfaces for scanning are scanned in opposite main scanning directions by using a single optical deflector. End portions of a scanning lens arranged in a scanning optical system are configured not to have refractive power in the main scanning direction. A synchronization light beam passes through the end portions of the scanning lens and falls on a light receiving element via a synchronizing optical system. The synchronizing optical system includes a first synchronizing lens, a synchronizing fold mirror, and a second synchronizing lens. The synchronizing fold mirror and the light receiving element are arranged to be in a conjugate relation with the second synchronizing lens.

11 Claims, 5 Drawing Sheets

U.S. PATENT DOCUMENTS

2008/0192319 A1 8/2008 Miyatake et al.
2009/0059337 A1* 3/2009 Saisho .................. 359/205

FOREIGN PATENT DOCUMENTS

| JP | 09197317 A | * | 7/1997 |
| --- | --- | --- | --- |
| JP | 11-44857 | | 2/1999 |
| JP | 11038347 A | * | 2/1999 |
| JP | 11044857 A | * | 2/1999 |
| JP | 11-157128 | | 6/1999 |
| JP | 2001-4948 | | 1/2001 |
| JP | 2001-10107 | | 1/2001 |
| JP | 3295281 | | 4/2002 |
| JP | 3444459 | | 6/2003 |
| JP | 3851469 | | 9/2006 |
| JP | 2006-309090 | | 11/2006 |

* cited by examiner

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2007-238198 filed in Japan on Sep. 13, 2007.

BACKGROUND OF THE INVENTION

1. Field of the Invention

The present invention relates to an optical scanning device for use in an image forming apparatus.

2. Description of the Related Art

In image forming apparatuses, such as laser printers, an optical scanning device is used to optically scan a target surface for scanning, which is photoconductive and photosensitive in nature. More particularly, in the optical scanning device, an optical deflector deflects a light beam emitted from a light source toward the target surface and a scanning optical system focuses the deflected light beam on the target surface. The scanning optical system includes, e.g., one or more fθ lenses that focus the deflected light beam on the target surface in the form of an optical spot. The optical spot is used to optically scan the target surface.

In a typical full-color image forming apparatus, four photosensitive members are arranged along the direction in which a sheet of recording medium is conveyed for image formation. Each photosensitive member functions as a target surface for scanning. Light beams emitted from a plurality of light sources are guided to each photosensitive member for optical scanning with a single optical deflector. Each deflected light beam then passes through one of a plurality of scanning optical systems. Each scanning optical system is arranged corresponding to a single photosensitive member. Upon passing through a scanning optical system, the deflected light beam is focused on the corresponding photosensitive members. In this way, all of the four photosensitive members are simultaneously exposed to light. As a result, an electrostatic latent image is formed on each photosensitive member. The electrostatic latent images are developed into single-color toner images by applying a toner of yellow, magenta, cyan, and black, respectively. The single-color toner images are then sequentially transferred and superimposed on the sheet to form a full-color toner image. The full-color toner image is then fixed on the sheet by applying heat and pressure to obtain a color image.

An image forming apparatus that forms a multicolor image (e.g., a dichromatic image or a full color image) by using a plurality of combinations of an optical scanning device and a photosensitive member is known as a tandem color image forming apparatus. In such a tandem color image forming apparatus, a single optical deflector can be used to deflect light beams toward a plurality of photosensitive members.

For example, an optical scanning device is disclosed in which an optical deflector receives light beams from two sides and distributes the light beams to a plurality of photosensitive members (refer to Japanese Patent Application Laid-open No. H11-157128 and Japanese Patent Application Laid-open No. H9-127443). Moreover, an optical scanning device is disclosed in which a plurality of substantially parallel light beams spaced apart in a sub-scanning direction are deflected by using an optical deflector and focused on corresponding photosensitive members by using a plurality of scanning optical elements arranged in the sub-scanning direction (refer to Japanese Patent Application Laid-open No. H9-54263). Furthermore, an optical scanning device is disclosed in which a plurality of light beams are deflected from one side of an optical deflector toward corresponding photosensitive members via a scanning optical system that includes three scanning lenses L1, L2, L3. From among the deflected light beams, the light beams corresponding to a certain set of photosensitive members pass through the scanning lens L1 while the light beams corresponding to another certain set of photosensitive members pass through the scanning lens L2. All the deflected light beams pass through the scanning lens L3 (refer to Japanese Patent Application Laid-open No. H9-54263, Japanese Patent Application Laid-open No. 2001-4948, Japanese Patent Application Laid-open No. 2001-10107, and Japanese Patent Application Laid-open No. 2001-33720).

In this way, a single optical deflector can be used to deflect light beams to a plurality of target surfaces for scanning. Such a configuration enables to downsize the optical scanning device and reduce the manufacturing cost. Configuring a compact optical scanning device is in line with growing demand for a compact and low-cost image forming apparatus.

To further reduce the manufacturing cost of the optical scanning device, the scanning optical system can be configured to include a single scanning lens (single-lens configuration) instead of two scanning lenses (two-lens configuration). Moreover, by arranging the scanning lens close to the optical deflector, the optical scanning device can be downsized. However, in that case, the scanning optical system functions as a magnifying optical system with respect to the sub-scanning direction. That is, the absolute value of magnification ratio in the sub-scanning direction of the scanning optical system becomes greater than one. In such a magnifying optical system, shape errors or positional errors of optical elements affect the optical performance of the optical scanning device to a great extent. Thus, it becomes difficult to manufacture a compact optical scanning device at low cost while maintaining high optical performance.

For example, Japanese Patent Application Laid-open No. 2006-309090 discloses an optical scanning device in which the scanning optical system has a single-lens configuration. In that optical scanning device, optical performance is maintained by optimizing the positioning of a scanning lens in the scanning optical system. However, because the scanning optical system functions as a magnifying optical system with respect to the sub-scanning direction, shape errors or positional errors of optical elements therein affect the optical performance to a greater extent as compared to a same-size optical system or a reduced optical system in which a scanning optical system has a two-lens configuration.

Meanwhile, an optical scanning device includes a light receiving element that, upon receiving a synchronization light beam via a synchronization optical system, detects a synchronization signal. To facilitate downsizing of the optical scanning device, it is desirable that the light receiving element is arranged at only one of a write start side and a write end side of the corresponding target surface for scanning. Such a configuration is hereinafter referred to as a single point synchronization configuration. In a single point synchronization configuration, when a scanning lens is arranged close to the optical deflector, the synchronization light beam passes through the scanning lens after getting deflected from the optical deflector. In that case, if the shape of the scanning lens varies due to temperature fluctuation, there is a possibility that a scanning position in a main scanning direction on the light receiving element deviates by a large amount (refer to Japanese Patent Application Laid-open No. H11-44857).

Such deviation in the scanning position is not easily noticeable in a black-and-white image forming apparatus. However, in the case of a color image forming apparatus of opposite scanning type in which two target surfaces are scanned in opposite main scanning directions by using a single optical deflector, the deviation in the scanning positions causes color shift in the color image thereby deteriorating the image quality. Moreover, if the optical path from the deflecting surface of the optical deflector to the light receiving element has an almost identical optical path length as the optical path from the deflecting surface of the optical deflector to the corresponding target surface for scanning, then it becomes difficult to downsize the optical scanning device.

To downsize a magnifying optical system, an optical deflector needs to deflect a light beam at a wider angle of view with respect to the optical axis in the main scanning direction. For that, it becomes necessary to configure the optical deflector with a large deflecting surface in the main scanning direction. That problem can be solved by using a polygon mirror as the optical deflector. The size of the deflecting surface of the polygon mirror can be controlled by reducing the number of deflecting surfaces and widening the angle of deflection. However, because it is necessary to rotate a polygon mirror at high speed, problems such as heat, noise, energy consumption, and speed-up limitation arise.

A synchronization light beam to be guided to a light receiving element is deflected at a wider angle with respect to the optical axis in the main scanning direction as compared to an angle at which a light beam to be guided to a target surface for scanning is deflected. Thus, it is necessary that optical elements in the synchronization optical system are accurately positioned with respect to the main scanning direction in an optical box.

SUMMARY OF THE INVENTION

It is an object of the present invention to at least partially solve the problems in the conventional technology.

According to an aspect of the present invention, there is provided an optical scanning device that includes a plurality of light sources that emits light beams corresponding to a plurality of target surfaces for scanning; a coupling lens that couples the light beams to specific beam shapes; a light collection optical system that collects coupled light beams coupled by the coupling unit in at least a sub-scanning direction; an optical deflector that deflects collected light beams collected by the light collection optical system in at least a main scanning direction; a scanning optical system that focuses deflected light beams deflected by the optical deflector on the target surfaces; a fold mirror that guides focused light beams focused by the scanning optical system toward the target surfaces; a light receiving element that detects a synchronization signal; and a synchronizing optical system that focuses a synchronization light beam on the light receiving element. The light source, the coupling lens, the light collection optical system, the optical deflector, the scanning optical system, the light receiving element, and the synchronizing optical system are arranged in a first optical box, at least the fold mirror is arranged in a second optical box, and an optical path length from a deflecting surface of the optical deflector to the light receiving element is shorter than an optical path length along an optical axis from the deflecting surface of the optical deflector to the target surface.

According to another aspect of the present invention, there is provided an image forming apparatus that performs an electrophotographic process to form an image. The image forming apparatus includes an optical scanning device that performs a lithographic exposure process of the electrophotographic process, the optical scanning device including a plurality of light sources that emits light beams corresponding to a plurality of target surfaces for scanning; a coupling lens that couples the light beams to specific beam shapes; a light collection optical system that collects coupled light beams coupled by the coupling unit in at least a sub-scanning direction; an optical deflector that deflects collected light beams collected by the light collection optical system in at least a main scanning direction; a scanning optical system that focuses deflected light beams deflected by the optical deflector on the target surfaces; a fold mirror that guides focused light beams focused by the scanning optical system toward the target surfaces; a light receiving element that detects a synchronization signal; and a synchronizing optical system that focuses a synchronization light beam on the light receiving element. The light source, the coupling lens, the light collection optical system, the optical deflector, the scanning optical system, the light receiving element, and the synchronizing optical system are arranged in a first optical box, at least the fold mirror is arranged in a second optical box, and an optical path length from a deflecting surface of the optical deflector to the light receiving element is shorter than an optical path length along an optical axis from the deflecting surface of the optical deflector to the target surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
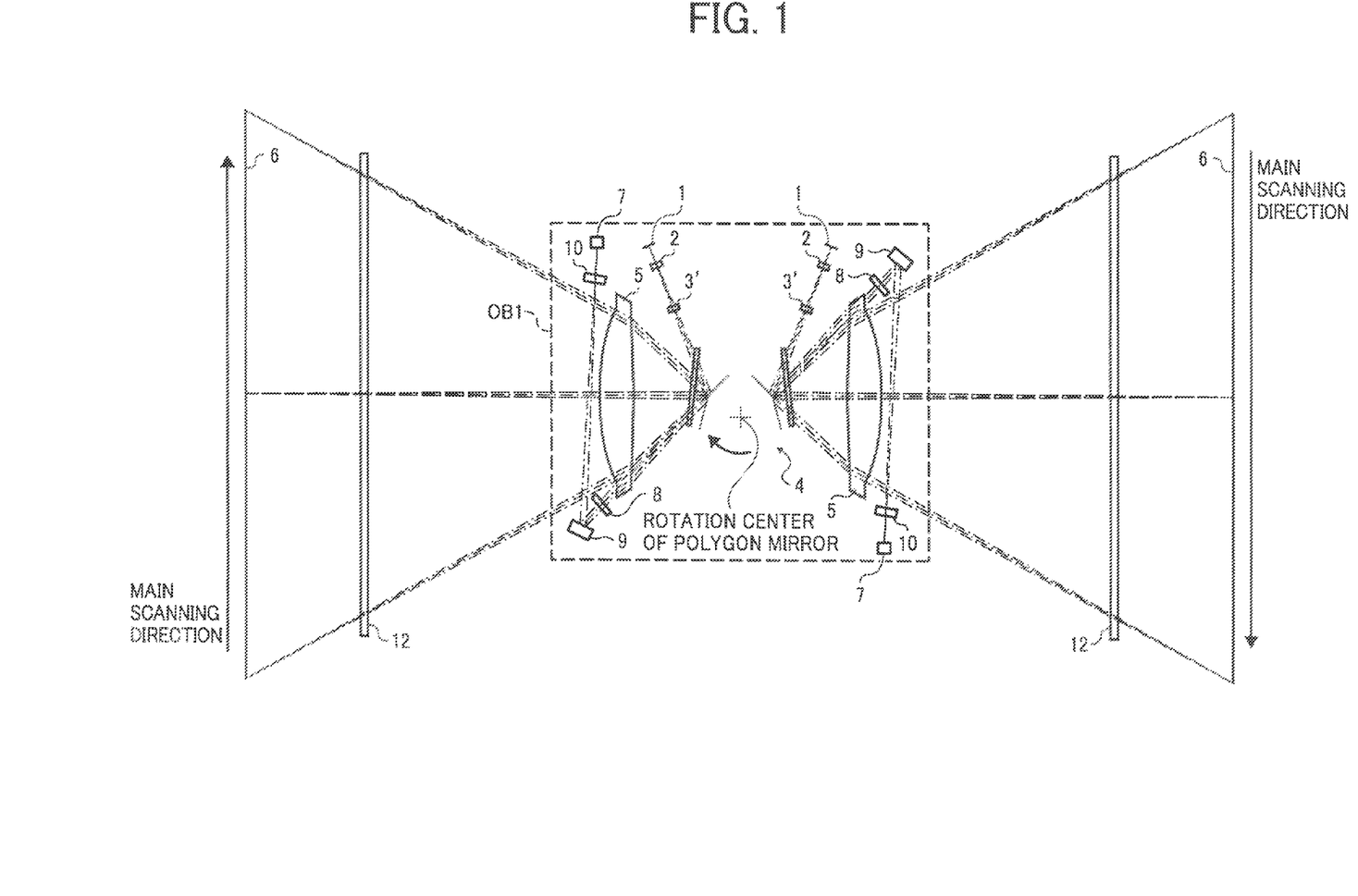
FIG. 1 is a plan view of an optical scanning device according to an embodiment of the present invention.
Figure 2:
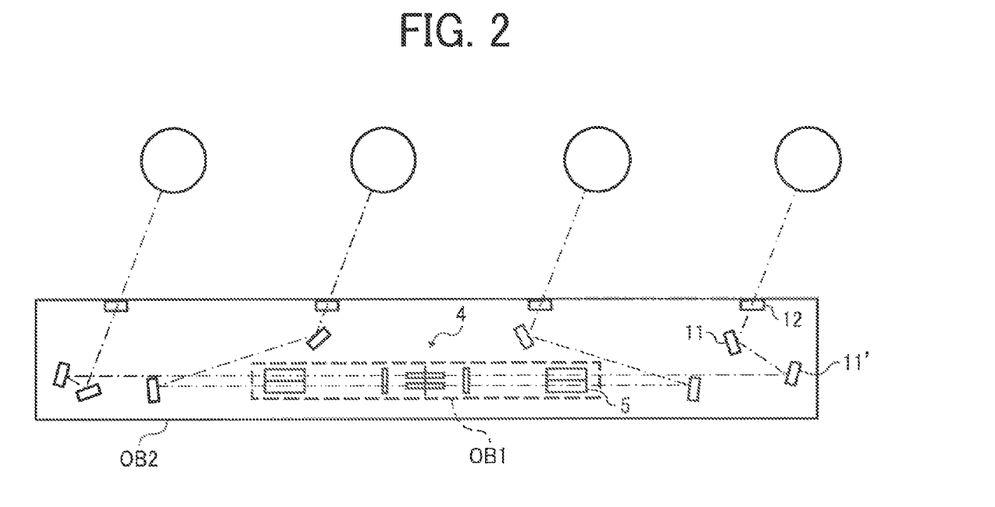
FIG. 2 is a side view of a scanning optical system in the optical scanning device.

FIG. 1 is a plan view of an optical scanning device according to an embodiment of the present invention. The optical scanning device shown in FIG. 1 is of opposite scanning type in which two target surfaces 6 for scanning are scanned in opposite main scanning directions by using a single polygon mirror 4. FIG. 2 is a side view of a scanning optical system in the optical scanning device.

The optical scanning device includes a first optical box OB1 and a second optical box OB2. The second optical box OB2 is not shown in FIG. 1 but shown in FIG. 2. The polygon mirror 4, which functions as an optical deflector for deflecting light beams toward the target surfaces 6, is arranged in the first optical box OB1. Moreover, with respect to each the target surface 6, a semiconductor laser 1, a coupling lens 2, a cylindrical lens 3, a scanning lens 5, a light receiving element 7, a first synchronizing lens 8, a synchronizing fold mirror 9, and a second synchronizing lens 10 are also arranged in the first optical box OB1. The following description is given with reference to a process of optical scanning with respect to a single the target surface 6.

The semiconductor laser 1 emits a diffusive light beam to the coupling lens 2. Upon passing through the coupling lens 2, the diffusive light beam is converted into a suitable form such as a substantially parallel light beam, a weakly diffusive light beam, or a weakly converging light beam.

Subsequently, upon passing through the cylindrical lens 3, the converted light beam is converged along a sub-scanning direction to fall on a deflecting surface of the polygon mirror 4.

The polygon mirror 4 rotates at a constant speed such that the converged light beam incident on a deflecting surface thereof is deflected at a constant angular velocity. The deflected light beam then passes through the scanning lens 5 and is focused on the target surface 6 via a plurality of scanning fold mirrors 11 and 11' (see FIG. 2). As a result, an optical spot is created on the target surface 6. The optical spot is used to optically scan the target surface 6.

The light receiving element 7 detects a synchronization signal upon being scanned by an optical spot. More particularly, first, a synchronization light beam deflected from the deflecting surface of the polygon mirror 4 passes through an end portion of the scanning lens 5, passes through the first synchronizing lens 8, and falls on the synchronizing fold mirror 9. The synchronization light beam is then deflected in a main scanning direction from the synchronizing fold mirror 9. Subsequently, when the deflected synchronization light beam passes through the second synchronizing lens 10, an optical spot is created on the light receiving element 7. Meanwhile, the first synchronizing lens 8, the synchronizing fold mirror 9, and the second synchronizing lens 10 constitute a synchronizing optical system.

An optical system in the optical path between the polygon mirror 4 and the target surface 6 is known as a scanning optical system (see FIG. 2). The scanning optical system has a single-lens configuration. That is, the scanning optical system includes only one lens in the form of the scanning lens 5. It is desirable to arrange the scanning lens 5 close to the polygon mirror 4. As a result, the size of the scanning lens 5 along the main scanning direction becomes smaller thereby helping to downsize the first optical box OB1 and reduce the manufacturing cost. Consequently, it is also possible to arrange the scanning fold mirrors 11 and 11' closer to the polygon mirror 4 thereby enabling to downsize the entire optical scanning device. Meanwhile, instead of a single-lens configuration, the scanning optical system can also be configured to have a two-lens configuration in which two scanning lenses are arranged. Still, from the perspective of cost and size, a single-lens configuration has more advantage than a two-lens configuration.

However, when the scanning lens 5 is arranged close to the polygon mirror 4, there is an increase in the magnification ratio in the sub-scanning direction of the scanning optical system. In other words, the scanning optical system functions as a magnifying optical system with respect to the sub-scanning direction. In such a case, shape errors or positional errors of the optical elements affect the optical performance of the optical scanning device to a great extent. More particularly, due to shape errors or positional errors, the field curvature in the sub-scanning direction of the optical elements varies by a large margin thereby causing fluctuation in the diameter of the optical spot. Thus, irrespective of a design-time diameter of the optical spot, the actual diameter of the optical spot increases by a large amount due to shape errors or positional errors of the optical elements.

To solve such a problem, the semiconductor laser 1, the coupling lens 2, the cylindrical lens 3, the polygon mirror 4, and the scanning lens 5 are arranged in the first optical box OB1; while the scanning fold mirrors 11 and 11', and a dust-tight glass 12 are arranged in the second optical box OB2.

In the first optical box OB1, the position of the coupling lens 2 along the optical axis is adjusted such that the field curvature in the main scanning direction of the semiconductor laser 1, the coupling lens 2, the cylindrical lens 3, the polygon mirror 4, and the scanning lens 5 is regulated. Similarly, the position of the cylindrical lens 3 along the optical axis is adjusted such that the field curvature in the sub-scanning direction of the semiconductor laser 1, the coupling lens 2, the cylindrical lens 3, the polygon mirror 4, and the scanning lens 5 is regulated. As a result, the effect of shape errors or positional errors on the field curvature can be reduced. Meanwhile, the field curvature of the optical elements in the second optical box OB2 cannot be regulated. However, because no lens is arranged in the second optical box OB2, the amount of field curvature therein is not considerably large. Moreover, because the first optical box OB1 is arranged in the second optical box OB2, fluctuation in the field curvature of the optical elements can be regulated irrespective of the large magnification ratio in the sub-scanning direction of the scanning optical system. As a result, it becomes possible to obtain an optical spot having a stable diameter.

Consider a case in which all optical elements in an optical scanning device are arranged in a single optical box. In that case, regulating the field curvature becomes a difficult task because of a turn-back in the optical path in the sub-scanning direction. Moreover, because the direction of emission of a light beam makes a certain angle with the optical box, it becomes complicated to arrange measuring equipments such as a beam-waist-position measuring equipment and the like. Such problems increase the size of the optical box and affect the work efficiency. However, according to the embodiment, the direction of emission of the light beam is horizontal in the first optical box OB1 and the size of the first optical box OB1 is not large. As a result, it is possible to easily arrange a beam-waist-position measuring equipment and improve the work efficiency.

Moreover, irrespective of the distance between the target surfaces 6, the abovementioned two-box configuration can be used only by modifying the design of the second optical box OB2.

As described above, the light receiving element 7 and the synchronizing optical system are arranged in the first optical box OB1. Moreover, the optical path from the deflecting surface of the polygon mirror 4 to the light receiving element 7 is configured to have a shorter optical path length than the optical path from the deflecting surface of the polygon mirror 4 to the target surface 6. That helps in downsizing the first optical box OB1 and in turn downsizing the optical scanning device. If the size of the first optical box OB1 is large, then irrespective of the position of the scanning lens 5 with respect to the polygon mirror 4, the distance between the scanning fold mirrors 11 and 11', which are arranged in the second optical OB2, and the polygon mirror 4 increases. That leads to an increase in the size of the optical scanning device, which is not desirable.

Consider a case in which a light receiving element is arranged in the second optical box OB2 instead of the first optical box OB1. In that case, the position of the synchronization light beam incident on the light receiving element fluctuates from an ideal incident position with respect to the main scanning direction and the sub-scanning direction. That happens because a positional error between the first optical box OB1 and the second optical box OB2 affects the positioning of the light receiving element in the second optical box OB2. Thus, the mechanical positioning of the light receiving element cannot guarantee the positional precision of the optical spot on the light receiving element.

On the one hand, when the light receiving element is not accurately positioned with respect to the main scanning direction, then a polygon mirror needs to deflect the synchronization light beam in a direction that makes a wider-than-usual angle of view with respect to the optical axis in the main scanning direction. For that, it is necessary to configure the polygon mirror with a larger deflecting surface in the main scanning direction. Such a configuration increases the size of the polygon mirror. However, from noise and energy consumption perspective, it is desirable to use a compact polygon mirror. Thus, when the light receiving element and the corresponding synchronizing optical system are arranged in the second optical box OB2, the positioning errors can affect the compactness of the optical scanning device.

On the other hand, when the light receiving element is not accurately positioned with respect to the sub-scanning direction, there is a possibility that the synchronization light beam does not properly fall on a light receiving surface of the light receiving element thereby causing fluctuation in the light intensity. That causes variation in the timing at which a synchronization signal is generated by the light receiving element. Consequently, a write start timing with respect to the target surface becomes unstable. Usually, the size of the light receiving surface in the sub-scanning direction is only about two millimeters to three millimeters. Thus, only if the light receiving element is accurately positioned with respect to the sub-scanning direction, then the light receiving surface can stably receive the synchronization light beam.

Taking into consideration such problems, the light receiving element 7 and the synchronizing optical system according to the embodiment are arranged in the first optical box OB1. Such a configuration enables to improve the positional precision of the light receiving element 7. As a result, the polygon mirror 4, which is compact and environment friendly, can be used and a stable synchronization signal from the light receiving element 7 can be obtained. Moreover, because the optical path from the deflecting surface of the polygon mirror 4 to the light receiving element 7 is configured to have a shorter optical path length than the optical path from the deflecting surface of the polygon mirror 4 to the target surface 6, it becomes possible to downsize the first optical box OB1 and thus downsize the optical scanning device.

Figure 3:
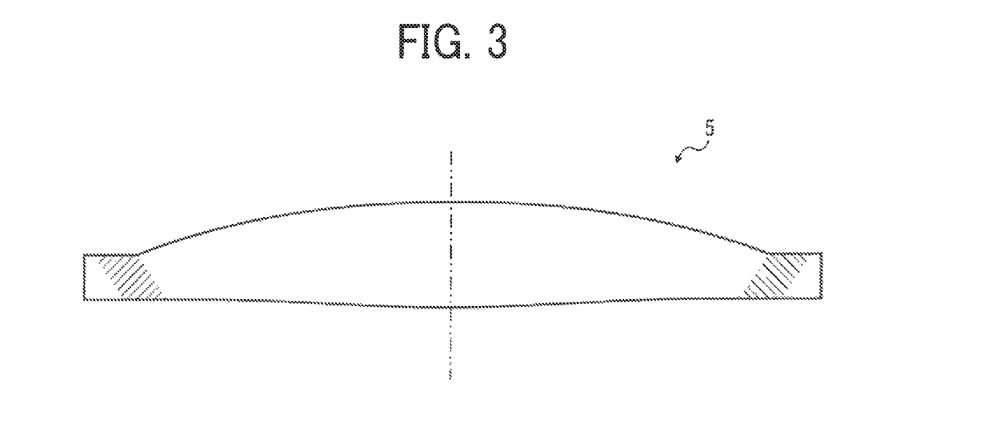
FIG. 3 is a side view of a scanning lens in the scanning optical system.

FIG. 3 is a side view for explaining the shape of the scanning lens 5. The end portions of the scanning lens 5 are configured not to have refractive power in at least the main scanning direction. The deflected synchronization light beam, which is guided to the light receiving element 7 via the synchronizing optical system, passes through one of the end portions of the scanning lens 5 not having refractive power in the main scanning direction.

As shown in FIG. 1, the synchronizing optical system that guides the deflected synchronization light beam to the light receiving element 7 is arranged only at the write start side of the target surface 6. Such a single point synchronization configuration helps in saving space and reducing manufacturing cost of the optical scanning device. Consider a case in which a conventional scanning lens, which entirely has refractive power in the main scanning direction, is used in a single point synchronization configuration. In that case, a light beam to be guided to a the target surface as well as a synchronization light beam to be guided to the synchronizing optical system passes through a refractive portion of the conventional scanning lens. However, any variation in the refractive index or in the shape of the conventional scanning lens, or in a laser diode (LD) wavelength due to temperature fluctuation can cause deviation in a scanning position on the target surface as well as on the light receiving element.

Figure 4:
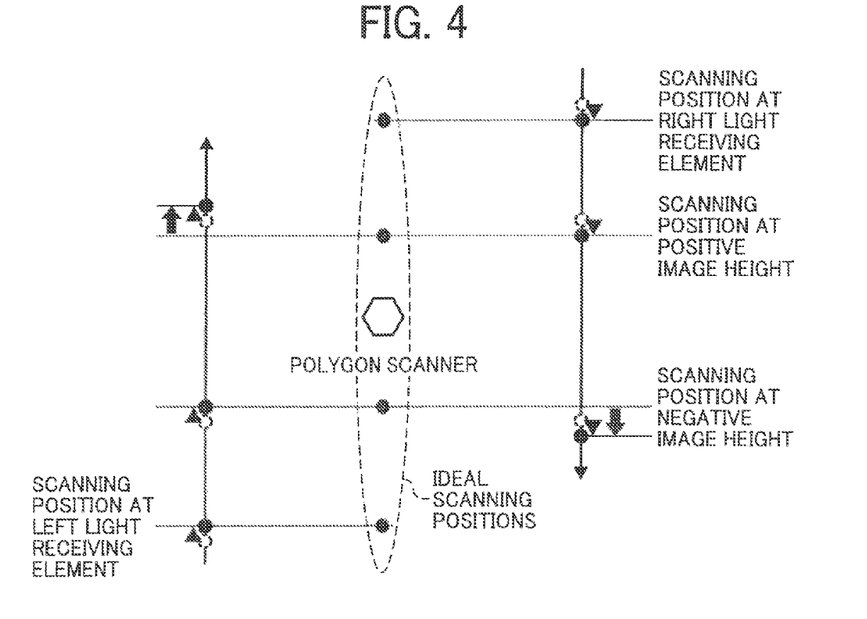
FIG. 4 is a diagram for explaining deviation in scanning positions due to rise in temperature when a conventional scanning lens is used.

FIG. 4 is a diagram for explaining deviation in scanning positions due to rise in temperature when a conventional scanning lens is used. When a conventional scanning lens is used in a single point synchronization configuration, then a scanning position in the main scanning direction on a light receiving element, a scanning position in the main scanning direction at a write start point on a the target surface, and a scanning position in the main scanning direction at a write end point on a the target surface undergo deviation due to rise in temperature as indicated by dotted circles in FIG. 4. The ideal scanning positions in the main scanning direction are indicated inside the central dotted portion in FIG. 4. Because the conventional scanning lens expands due to rise in temperature, the refractive power thereof in the main scanning direction becomes weak. Consequently, the scanning positions deviate from corresponding image height positions. Because the write start timing is determined based on a synchronization detection signal after a predetermined time interval, the scanning position at the write start point, which deviates in the same direction as the scanning position on the light receiving element, is corrected to a position indicated by a filled circle in FIG. 4.

However, at the write end point, the direction corrected by synchronization is identical to the direction in which the scanning position in the main scanning direction deviates. As a result, the amount of deviation in the scanning position in the main scanning direction increases. In this way, when a conventional scanning lens is used in a single point synchronization configuration, the scanning position in the main scanning direction at the write end point deviates by a large amount due to rise in temperature.

As described above, in an optical scanning device of opposite scanning type, two or more target surfaces are scanned in opposite main scanning directions by using a single polygon mirror. To obtain a color image, an image formed on the left the target surface and an image formed on the right the target surface are superimposed. For that, the write start point and the write end point of the left the target surface are matched with the write start point and the write end point, respectively, of the right the target surface. In that case, large relative deviation occurs in the scanning positions in the main scanning direction. That causes color shift in the color image thereby deteriorating the image quality.

Figure 5:
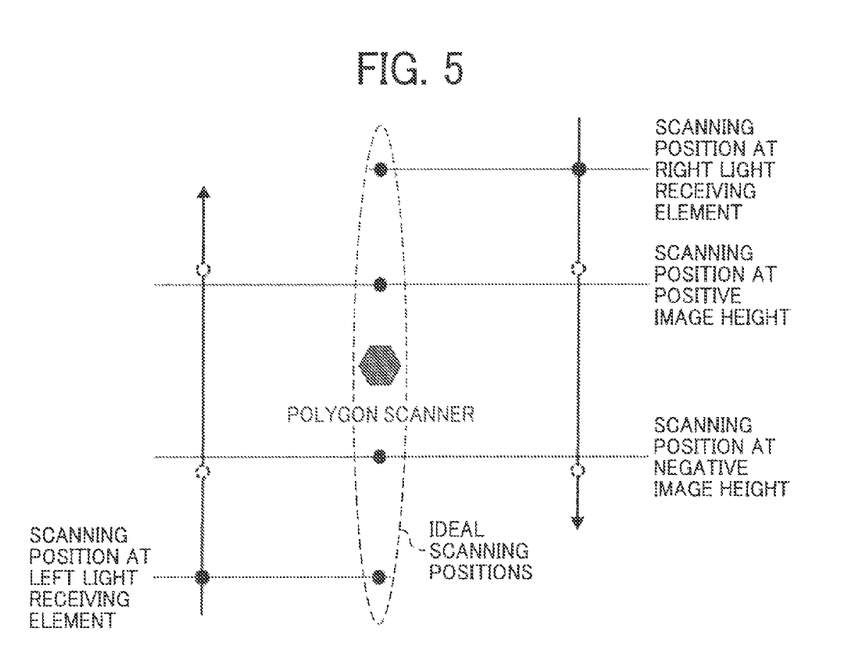
FIG. 5 is a diagram for explaining deviation in scanning positions due to rise in temperature when the scanning lens according to the embodiment is used.

FIG. 5 is a diagram for explaining deviation in scanning positions due to rise in temperature when the scanning lens 5 is used. The end portions of the scanning lens 5 are configured not to have refractive power in the main scanning direction. Therefore, when the deflected synchronization light beam passes through one of those end portions, then even the temperature fluctuation does not cause deviation in the scanning position in the main scanning direction on the light receiving element 7. Moreover, the first synchronizing lens 8 and the second synchronizing lens 10 are arranged to guide the deflected synchronization light beam along the optical path such that the scanning position in the main scanning direction is maintained stable.

However, if the scanning lens 5 expands due to rise in temperature, then the scanning position in the main scanning direction at the write start point and at the write end point deviate as indicated by dotted circles in FIG. 5. However, when an image formed on the left the target surface 6 and an image formed on the right the target surface 6 are superimposed, the relative deviation in the scanning positions at the write start point and the write end point is identical. That reduces color shift in the color image thereby maintaining the image quality.

Meanwhile, instead of using the semiconductor laser 1 as the light source, a multibeam light source can also be used. Even in that case, it is possible to maintain the image quality by reducing color shift. Consider a case in which the wavelength of each light beam emitted from the multibeam light source is fluctuating. Due to such wavelength fluctuation, the scanning position in the main scanning direction with respect to each light beam deviates. When a conventional lens is used in combination with a multibeam light source, then the scanning position in the main scanning direction on the light receiving element by each light beam deviates due to wavelength fluctuation. As a result, in addition to color shift, the write end point varies for each scanning line. That causes color shift and vertical line shift in the color image thereby deteriorating the image quality.

Figure 6:
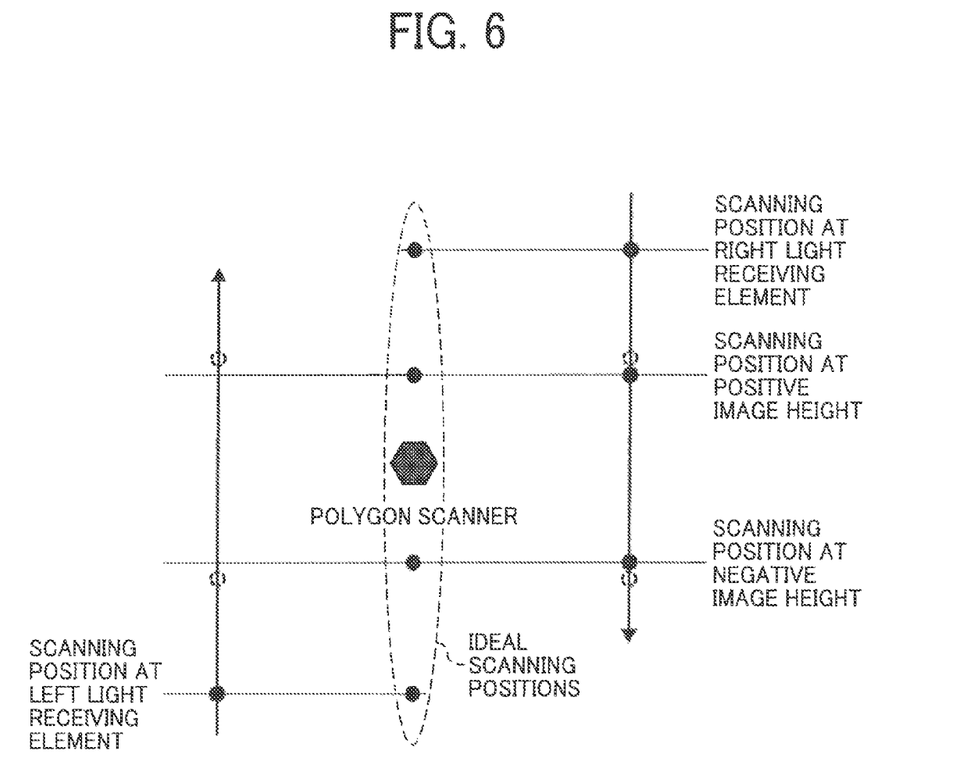
FIG. 6 is a diagram for explaining deviation in scanning positions due to fluctuation in wavelength of only one light beam used in a two-beam writing process.

FIG. 6 is a diagram for explaining deviation in scanning positions due to fluctuation in wavelength of only one light beam used in a two-beam writing process.

When the scanning lens 5 is used in combination with a multibeam light source, then there is no deviation in the scanning position in the main scanning direction on the light receiving element 7. Consequently, it becomes possible to reduce the amount of deviation in the scanning position in the main scanning direction at the write start point and at the write end point. Thus, although some deviation in the scanning positions in the main scanning direction occurs at the write start point and at the write end point, the amount of deviation can be considerably reduced.

Meanwhile, it is desirable to use an LD array having uniformly spaced-apart light emitting members as the multibeam light source. However, it is also possible to use a combination of normal LDs.

Regarding the synchronizing optical system, it is desirable to arrange at least one synchronizing fold mirror 9 and downsize the first optical box 1 while securing a sufficient optical path in the synchronizing optical system.

However, if the synchronizing fold mirror 9 tilts in the sub-scanning direction at the time of arranging, then the scanning position in the sub-scanning direction on the light receiving element 7 deviates by a large amount. As a result, the synchronization light beam does not properly fall on the light receiving surface of the light receiving element 7. That causes variation in the timing at which a synchronization signal is generated by the light receiving element 7. Consequently, the write start timing on the target surface 6 becomes unstable. Thus, even if the light receiving element 7 and the synchronizing optical system are arranged in the first optical box OB1, the light receiving surface cannot stably receive the light beam if the synchronizing fold mirror 9 tilts in the sub-scanning direction.

To solve such a problem, the synchronizing optical system is configured such that the synchronizing fold mirror 9 and the light receiving element 7 are in a conjugate relation with the second synchronizing lens 10. In such a configuration, even if the synchronizing fold mirror 9 tilts in the sub-scanning direction, the deviation in the scanning position in the sub-scanning direction on the light receiving element 7 is reduced because of the second synchronizing lens 10. Thus, the synchronization light beam can properly fall on the light receiving surface of the light receiving element 7.

As described above, the optical path from the deflecting surface of the polygon mirror 4 to the light receiving element 7 is configured to have a shorter optical path length than the optical path from the deflecting surface of the polygon mirror 4 to the target surface 6. Thus, it is sufficient to arrange only one synchronizing fold mirror 9 in the synchronizing optical system. If more than one synchronizing fold mirrors 9 are arranged, then the second synchronizing lens 10 cannot be arranged in conjugate relation with the synchronizing fold mirrors 9 and the light receiving element 7. That can cause a large deviation in the scanning position in the sub-scanning direction on the light receiving element 7.

On the other hand, it is also desirable that the synchronizing optical system is configured to have a sufficiently long optical path even when only one synchronizing fold mirrors 9 is arranged. Otherwise, following problem occurs.

Because the end portions of the scanning lens 5 have no refractive power in the main scanning direction, it is necessary to arrange in the synchronizing optical system a synchronizing lens having refractive power in the main scanning direction. According to the embodiment, the first synchronizing lens 8 is arranged as the synchronizing lens having refractive power in the main scanning direction. Moreover, it is desirable that the first synchronizing lens 8 is arranged farthest from the light receiving element 7 and closest to the polygon mirror 4 from among the first synchronizing lens 8, the synchronizing fold mirror 9, and the second synchronizing lens 10. Such a configuration enables to increase the focal length of the synchronizing optical system in the main scanning direction. That is, the focal length of the synchronizing optical system in the main scanning direction can be approximated to the focal length of the scanning lens 5 in the main scanning direction.

However, if the focal length of the synchronizing optical system in the main scanning direction becomes too short with respect to the focal length of the scanning optical system in the main scanning direction, then the speed of scanning the light receiving element 7 slows down as compared to the speed of scanning the target surface 6. That causes fluctuation in the write start point on the target surface 6. In other words, a synchronization detection error generated at the light receiving element 7 gets magnified at the write start point. Thus, in the optical scanning device of opposite scanning type, fluctuation in the mutually opposite write start points causes color shift in the color image thereby deteriorating the image quality.

To sum up, because only one synchronizing fold mirror 9 is arranged in the synchronizing optical system, it becomes possible to downsize the first optical box OB1. The second synchronizing lens 10 is arranged to be in conjugate relation with the synchronizing fold mirror 9 and the light receiving element 7. The second synchronizing lens 10 has refractive power in the sub-scanning direction and focuses a light beam of a predetermined diameter on the light receiving element 7. The first synchronizing lens 8 is arranged closest to the polygon mirror 4 and has refractive power in the main scanning direction. Meanwhile, the end portions of the scanning lens 5 can be configured to have refractive power in the sub-scanning direction or configured to have light gathering power in combination with the first synchronizing lens 8.

Figure 7:
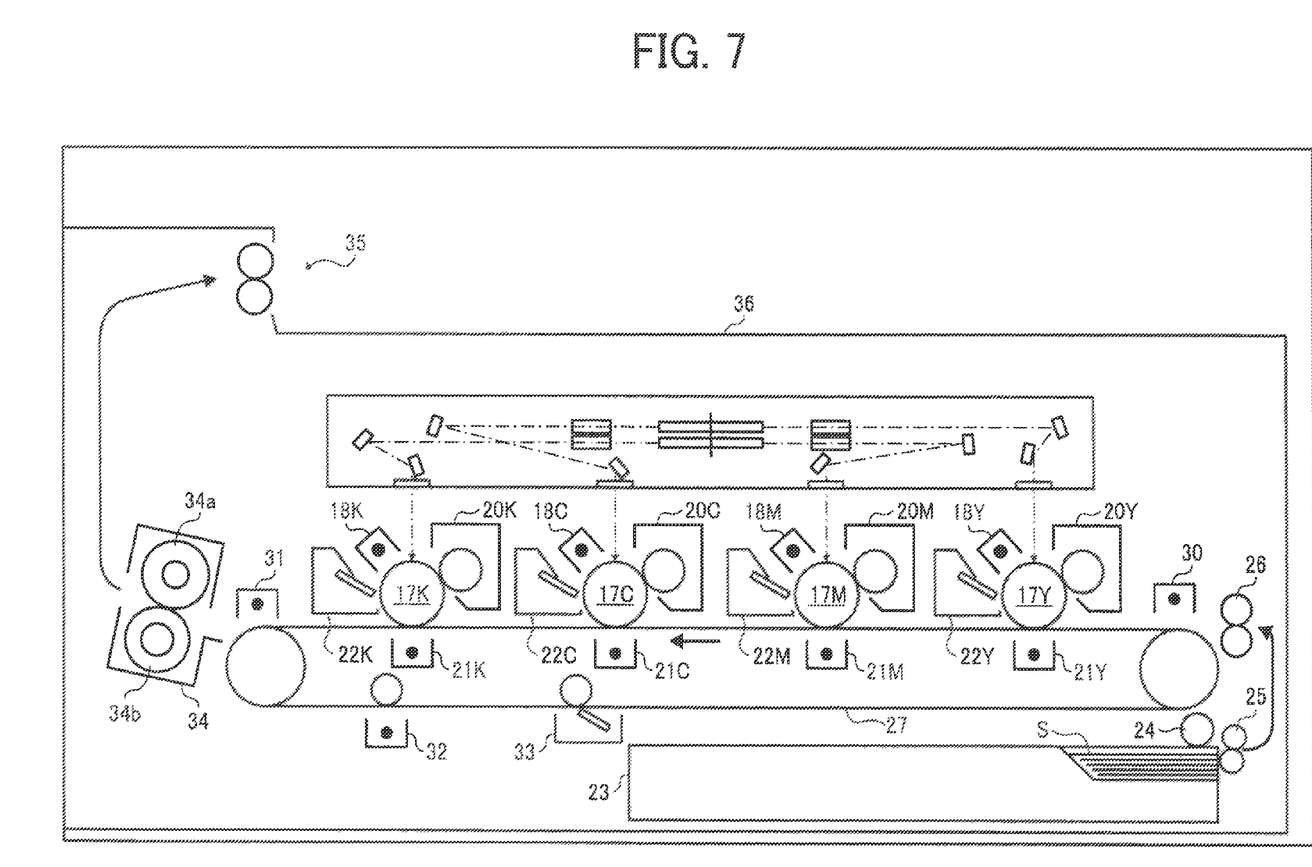
FIG. 7 is a schematic diagram of an exemplary image forming apparatus that includes the optical scanning device.

FIG. 7 is a schematic diagram of an exemplary image forming apparatus that performs optical scanning for image formation.

The image forming apparatus described with reference to FIG. 7 is a tandem color laser printer. In the tandem color laser printer, a paper feeding cassette 23 is arranged in the bottom part for feeding a sheet of paper to a conveying belt 27. Four photosensitive members 17Y, 17M, 17C, and 17K having an identical diameter are equidistantly arranged to abut against the conveying belt 27 from above. The photosensitive members 17Y, 17M, 17C, and 17K are arranged in that order from upstream of a conveying direction in which a sheet is conveyed on the conveying belt 27. The photosensitive members 17Y, 17M, 17C, and 17K function as target surfaces on which a toner image in yellow, magenta, cyan, and black, respectively, is formed.

Each of the photosensitive members 17Y, 17M, 17C, and 17K is a part of an image forming unit. The image forming unit with respect to the photosensitive member 17Y includes a charging unit 18Y, a scanning optical system, a developing unit 20Y, a transfer unit 21Y, and a cleaning unit 22Y arranged in that order around the photosensitive member 17Y. The image forming unit with respect to each of the photosensitive members 17M, 17C, and 17K has an identical structure. Although one scanning optical system is arranged for each photosensitive member (17Y, 17M, 17C, or 17K), there is only one scanning lens and it is shared by all the scanning optical systems. A registration roller 26 and a belt charging unit 30 are arranged in the upstream of the conveying belt 27; while a separation charger unit 31, a neutralizing unit 18, a belt cleaning unit 22, and the like are arranged in the downstream of the conveying belt 27. A fixing unit 34 is arranged subsequent to the separation charger unit 31. After passing through the fixing unit, a sheet is discharged into a catch tray 36 via a pair of discharging rollers 35.

In a full-color image formation mode, each of the scanning optical systems optically scans the corresponding photosensitive member 17Y, 17M, 17C, or 17K based on an image signal of corresponding toner color. As a result, an electrostatic latent image is formed on each of the photosensitive members 17Y, 17M, 17C, and 17K. Subsequently, each of the developing units 20Y, 20M, 20C, and 20K applies corresponding toner to the electrostatic latent image formed on the corresponding photosensitive member 17Y, 17M, 17C, or 17K. As a result, four single-color toner images are formed on the photosensitive members 17Y, 17M, 17C, and 17K. Each single-color toner image is then sequentially transferred and superimposed on the sheet, which is conveyed on the conveying belt 27, to form a full-color toner image. The fixing unit 34 then fixes the full-color toner image on the sheet to obtain a color image. Finally, the sheet is discharged to the catch tray 36 via the pair of discharging rollers 35.

By configuring each of the scanning optical systems to be a part of the abovementioned optical scanning device, it is possible to effectively correct scanning line deviation and wavefront aberration thereby enabling to obtain a high quality color image without color shift.

Thus, according to an aspect of the present invention, it is possible to configure a compact magnifying optical system, in which a scanning lens is arranged close to an optical deflector, at low cost and maintain the optical performance of the magnifying optical system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A color image forming apparatus comprising:
    a light source that emits a light beam corresponding to a target surface for scanning;
    a coupling lens that couples the light beam to specific beam shape;
    a light collection optical system that collects coupled light beam coupled by the coupling lens in at least a sub-scanning direction;
    an optical deflector that deflects collected light beam collected by the light collection optical system in at least a main scanning direction;
    a scanning optical system that focuses deflected light beam deflected by the optical deflector on the target surface;
    a fold mirror that guides focused light beam focused by the scanning optical system toward the target surface;
    a light receiving element that detects a synchronization light beam; and
    the synchronizing optical system that focuses a synchronization light beam on the light receiving element, wherein
    the light source, the coupling lens, the light collection optical system, the optical deflector, the scanning optical system, the light receiving element, and the synchronizing optical system are arranged in a first optical box,
    at least the fold mirror is arranged in a second optical box, and
    an optical path length from a deflecting surface of the optical deflector to the light receiving element is shorter than an optical path length from the deflecting surface of the optical deflector to a center of a scanned area of the target surface in the main scanning direction.

2. The color image forming apparatus according to claim 1, wherein
    the scanning optical system includes a single scanning lens through which the deflected light beam and the synchronization light beam pass, and
    a portion of the scanning lens through which the synchronization light beam passes does not have refractive power in at least the main scanning direction.

3. The color image forming apparatus according to claim 1, wherein the light source is a multibeam light source that includes a plurality of light emitting members.

4. The color image forming apparatus according to claim 1, wherein
    the synchronizing optical system includes a plurality of focusing lenses for focusing the synchronization light beam on the light receiving element, and
    a focusing lens from among the focusing lenses that is arranged closest to the optical deflector has strongest refractive power in the main scanning direction.

5. The color image forming apparatus according to claim 1, wherein
    the synchronizing optical system includes a synchronizing fold mirror that deflects the synchronization light beam in the main scanning direction and a focusing lens that is arranged between the synchronizing fold mirror and the light receiving element, and
    the synchronizing fold mirror and the light receiving element are in a conjugate relation with the focusing lens.

6. The color image forming apparatus according to claim 1, wherein the synchronizing optical system includes a fold mirror that is arranged in a first corner of the first optical box, and the fold mirror is arranged such that the synchronization light beam is reflected to a second corner of the first optical box, the light receiving element arranged in the second corner.

7. The color image forming apparatus according to claim 1, wherein the first optical box includes two light sources, two coupling lenses, two light collection optical systems, and two scanning optical systems, to form a first and a second scanner, the first and the second scanner arranged symmetrically towards each other with the optical deflector arranged in a center of the first optical box, serving as an optical deflection device for both the first and second scanner.

8. A color image forming apparatus that performs an electrophotographic process to form an image, the image forming apparatus comprising an optical scanning device that performs a lithographic exposure process of the electrophotographic process, the optical scanning device including
    a light source that emits a light beam corresponding to a target surface for scanning;
    a coupling lens that couples the light beam to specific beam shape;
    a light collection optical system that collects coupled light beam coupled by the coupling lens in at least a sub-scanning direction;
    an optical deflector that deflects collected light beam collected by the light collection optical system in at least a main scanning direction;
    a scanning optical system that focuses deflected light beam deflected by the optical deflector on the target surface;
    a fold mirror that guides focused light beam focused by the scanning optical system toward the target surface;
    a light receiving element that detects a synchronization light beam; and
    the synchronizing optical system that focuses a synchronization light beam on the light receiving element, wherein
    the light source, the coupling lens, the light collection optical system, the optical deflector, the scanning optical system, the light receiving element, and the synchronizing optical system are arranged in a first optical box,
    at least the fold mirror is arranged in a second optical box, and
    an optical path length from a deflecting surface of the optical deflector to the light receiving element is shorter than an optical path length from the deflecting surface of the optical deflector to a center of a scanned area of the target surface in the main scanning direction.

9. The color image forming apparatus according to claim 8, further comprising at least four photosensitive members each functioning as the target surface, wherein
    the image forming apparatus forms a color image by using the photosensitive member.

10. The color image formatting apparatus according to claim 8, wherein the synchronizing optical system includes a fold mirror that is arranged in a first corner of the first optical box, and the fold mirror is arranged such that the synchronization light beam is reflected to a second corner of the first optical box, the light receiving element arranged in the second corner.

11. The color image forming apparatus according to claim 8, wherein the first optical box includes two light sources, two coupling lenses, two light collection optical systems, and two scanning optical systems, to form a first and a second scanner, the first and the second scanner arranged symmetrically towards each other with the optical deflector arranged in a center of the first optical box, serving as an optical deflection device for both the first and second scanner.

* * * * *